United States Patent
Louis et al.

(10) Patent No.: US 6,456,465 B1
(45) Date of Patent: Sep. 24, 2002

(54) VERTICAL GIANT MAGNETORESISTANCE SENSOR USING A RECESSED SHIELD

(75) Inventors: Ernest Anthony Louis, San Jose; Ningjia Zhu, Fremont; Peter Ispvan Bonyhard, Milpitas, all of CA (US)

(73) Assignee: Read-Rite Corporation, Fremont, CA (US)

( * ) Notice: Subject to any disclaimer, the term of this patent is extended or adjusted under 35 U.S.C. 154(b) by 0 days.

(21) Appl. No.: 09/436,979

(22) Filed: Nov. 9, 1999

(51) Int. Cl.⁷ .................................................. G11B 5/39
(52) U.S. Cl. ........................................ 360/319; 360/322
(58) Field of Search ................................. 360/314, 317, 360/319, 322, 324.1, 324.11, 324.12, 126

(56) References Cited

U.S. PATENT DOCUMENTS

| | | | |
|---|---|---|---|
| 4,639,811 A | | 1/1987 | Diepers et al. |
| 5,375,022 A | * | 12/1994 | Gill et al. ................... 360/319 |
| 5,424,890 A | * | 6/1995 | Suyama et al. ............. 360/322 |
| 5,486,967 A | | 1/1996 | Tanaka et al. |
| 5,560,097 A | | 10/1996 | Bajhorek et al. |
| 5,566,442 A | | 10/1996 | Gaud et al. |
| 5,585,986 A | | 12/1996 | Parkin |
| 5,599,635 A | | 2/1997 | Katori et al. |
| 5,750,270 A | | 5/1998 | Tang et al. |
| 5,768,071 A | | 6/1998 | Lin |
| 5,792,564 A | | 8/1998 | Hikosaka et al. |
| 5,818,685 A | | 10/1998 | Thayamballi et al. |
| 5,822,153 A | | 10/1998 | Lairson et al. |
| 5,825,594 A | * | 10/1998 | Fukumoto et al. .......... 360/319 |
| 5,828,525 A | | 10/1998 | Iwasaki et al. |
| 5,828,529 A | | 10/1998 | Gill |
| 5,835,003 A | | 11/1998 | Nickel et al. |
| 5,859,753 A | | 1/1999 | Ohtsuka et al. |
| 5,867,350 A | * | 2/1999 | Haga et al. .................. 360/319 |
| 5,872,691 A | * | 2/1999 | Fukuyama et al. ......... 360/322 |
| 5,875,078 A | * | 2/1999 | Suyama et al. ............. 360/322 |
| 5,973,889 A | * | 10/1999 | Ruigrok ...................... 360/319 |
| 6,130,810 A | * | 10/2000 | Shibata et al. .............. 360/322 |

* cited by examiner

*Primary Examiner*—David L. Ometz
(74) *Attorney, Agent, or Firm*—Sawyer Law Group LLP

(57) ABSTRACT

A method and system for providing a magnetoresistive head that reads data from a recording media is disclosed. The method and system include providing a first shield, a second shield, a magnetoresistive sensor, and a lead. The first shield has a first end, a central portion and a second end. The first end is closer to the recording media during use than the second end. The second shield has a first end, a central portion, and a second end. The first end of the second shield is separated from the first end of the first shield by a read gap. The central portion of the second shield is separated from the central portion of the first shield by a distance that is greater than the read gap. The magnetoresistive sensor is disposed between the first shield and the second shield and has a front end and a back end. The front end of the magnetoresistive sensor is electrically coupled with the first end of the first shield or the first end of the second shield. The lead is electrically coupled with the back end of the magnetoresistive sensor. Thus, current is driven through the magnetoresistive sensor in a direction substantially perpendicular to the recording media during use.

21 Claims, 11 Drawing Sheets

300

310

VERTICAL GIANT MAGNETORESISTANCE SENSOR USING A RECESSED SHIELD

FIELD OF THE INVENTION

The present invention relates to magnetic recording technology, and more particularly to a giant magnetoresistive read head which is capable of being used at high magnetic recording densities.

BACKGROUND OF THE INVENTION

Magnetoresistive ("MR") heads are currently used in read heads or for reading in a composite head. FIG. 1A is a diagram of a conventional MR head 10. The MR head 10 includes a first shield 14 formed on a substrate 12. The MR head 10 also includes a first gap 16 separating a MR sensor 30 from the first shield 14. The MR head 10 also includes a pair of hard bias layers 18a and 18b. The hard bias layers 18a and 18b magnetically bias layers in the MR element 30. The MR head 10 also includes lead layers 19a and 19b, which conduct current to and from the MR element 30. A second gap 20 separates the MR sensor 30 from a second shield 22. When brought in proximity to a recording media (not shown), the MR head 10 reads data based on a change in the resistance of the MR sensor 30 due to the field of the recording media.

FIG. 1B depicts another view of the conventional MR head 10. For clarity, only a portion of the conventional MR head 10 is depicted. Also shown is the surface of the recording media 40. Thus, the air-bearing surface (ABS) is shown. Depicted in FIGS. 1B are the first shield 14, the second shield 22, the MR sensor 30 and the leads 19a and 19b. Also shown is the height of the MR sensor 30, also known as the stripe height (h).

Giant magnetoresistance ("GMR") has been found to provide a higher signal for a given magnetic field. Thus, GMR is increasingly used as a mechanism for conventional higher density MR sensors 30. One MR sensor 30 which utilizes GMR to sense the magnetization stored in recording media is a conventional spin valve. FIG. 2A depicts one conventional GMR sensor 30', a conventional spin valve. The conventional GMR sensor 30' typically includes a seed layer 31, an antiferromagnetic ("AFM") layer 32, a pinned layer 34, a spacer layer 36, a free layer 38, and a capping layer 39. The seed layer is used to ensure that the material used for the AFM layer 32 has the appropriate crystal structure and is antiferromagnetic in nature. The spacer layer 36 is a nonmagnetic metal, such as copper. The pinned layer 34 and the free layer 38 are magnetic layers, such as CoFe. The magnetization of the pinned layer 34 is pinned in place due to an exchange coupling between the AFM layer 32 and the pinned layer 34. The magnetization of the free layer 38 is free to rotate in response to the magnetic field of the recording media 40. However, note that other conventional GMR sensors, such as conventional dual spin valves, conventional synthetic spin valves, are also used.

Conventional GMR sensors 30' are used in one of two configurations, current-in-plane ("CIP") or current-perpendicular-to-plane ("CPP"). For most commercial devices, however, the CIP configuration is used. FIG. 3 depicts the CIP configuration. Only portions of the conventional GMR sensor 30' as it is used in the conventional MR head 10, is depicted. Also depicted is the recording media 40. The height (h), width (w) and thickness (t) of the conventional GMR sensor 30' is also shown. In the CIP configuration, current is driven parallel to the planes of the conventional GMR sensor 30'. Thus, the arrow 44 depicts the direction of current. The down track direction 42 is the direction in which the head is traveling. Thus, the track width of the recording media 40 lies along the direction in which current flows. The width of the conventional GMR sensor 30' is set by and typically lower than the track width of the recording media 40. Note that in the CPP configuration, not shown, current is driven perpendicular to the planes of the conventional GMR sensor 30'. Thus, current would be parallel or antiparallel to the down track direction 42 of FIG. 3.

Use of a the GMR sensor 30' in another configuration is described in U.S. Pat. No. 5,8589,753 by Ohtsuka et al. (Ohtsuka). Ohtsuka discloses the use of pairs of spin valves in which current is driven perpendicular to the surface of the recording media. In one spin valve, current is driven towards the recording media, while in the other spin valve current is driven away from the recording media. In order to drive the current, Ohtsuka couples the spin valves to the shields.

Although the conventional MR head 10 is capable of reading the recording media 40, the current trend in magnetic recording is toward higher densities. For example, it is currently desired to read recording media having a track density of thirty-five kilo-tracks-per-inch ("kTPI"). At these densities, the width (w) of the conventional GMR sensor 30' is desired to be less than 0.5 $\mu$m, which is less than the width of the conventional GMR sensor 30' in current generation devices. At higher densities, the width of the conventional GMR sensor 30' will be less, for example on the order of 0.2–0.3 $\mu$m. At the same time, it is desirable to have a particular resistance for the sensor, typically on the order of twenty-five to forty-five Ohms. The resistance of the sensor is proportional to the length of the sensor along which the current travels and inversely proportional to the cross-sectional area through which the current passes. In the CIP configuration, depicted in FIG. 3, the resistance is proportional to the track width (w) and inversely proportional to the thickness (t) and stripe height (h). Furthermore, the thickness of the conventional GMR sensor 30' cannot be radically changed. Consequently, the thickness of the conventional GMR sensor 30' cannot be used as a mechanism for altering the resistance of the conventional GMR sensor 30'. As the track width and, therefore, the width of the conventional GMR sensor 30' decrease, the stripe height must decrease to maintain approximately the same resistance. Current generation stripe heights may be on the order of 0.5 $\mu$m, approximately half of the width of current generation versions of the conventional GMR sensor 30'. However, as discussed above, the width of the GMR sensor 30' is desired to be below 0.5 $\mu$m. For a sensor width of approximately 0.2–0.3 $\mu$m, the stripe height would be reduced to on the order of 0.1 $\mu$m in order to maintain the same resistance. Significantly shorter stripe heights may be difficult to fabricate because the conventional GMR sensor 30' is typically lapped to set the stripe height. Lapping can vary by approximately 0.2 to 0.3 $\mu$m. When the stripe height is desired to be less than or approximately the same as the variation induced by lapping, it may not be possible to fabricate conventional GMR sensors 30' using conventional techniques. Furthermore, even if a conventional GMR sensor 30' having such a small stripe height can be fabricated, heating may drastically shorten the life of the GMR sensor 30'. Consequently, the conventional GMR sensor 30' in the conventional MR head 10 may be unsuitable for higher track densities.

Furthermore, as the stripe height of the conventional GMR sensor 30' is decreased, the conventional GMR sensor 30' becomes more subject to destruction due to electrostatic discharge ("ESD"). Reducing the stripe height of the conventional GMR sensor 30' renders the GMR sensor 30' less able to dissipate a charge through the leads 19a and 19b (shown in FIG. 1B). Consequently, when the conventional GMR sensor 30' gains an electrostatic charge, the charge is more liable to jump through one of the gaps 16 or 20 (shown in FIG. 1A) to one of the shields 14 or 22, respectively. Generally, such a discharge destroys the conventional GMR sensor 30'. Consequently, as the stripe height of the conventional GMR sensor decreases, the conventional GMR sensor 30' becomes increasingly prone to destruction due to ESD.

There is an additional limiting factor to the height of the conventional GMR sensor 30'. As magnetic flux travels up the conventional GMR sensor 30', away from the recording media 40, flux leaks out of the conventional GMR sensor 30'. The first shield 14 and second shield 22 are significantly larger than the conventional GMR sensor 30'. Thus, magnetic flux leaks out of the conventional GMR sensor 30' and into the shields 14 and 22. The height at which virtually all of the magnetic flux has leaked out of the conventional GMR sensor 30' is defined as the flux decay length. If the conventional GMR sensor 30' is made longer than the flux decay length, the additional height of the conventional GMR sensor 30' will contribute to the resistance, but not to the magnetoresistance. The additional height of the conventional GMR sensor 30' will, therefore, be wasted. Thus, the height of the conventional GMR sensor 30' should be less than the flux decay length. However, in most conventional systems, the desired resistance, discussed above, results in a significantly shorter height for the conventional GMR sensor 30' than the flux decay length.

In addition, if the GMR sensor 30 is used in the CPP configuration, it is extremely difficult to fabricate, even for current generation conventional MR heads 10. The CPP configuration will also still result in a device resistance that is too low.

Accordingly, what is needed is a system and method for providing a MR head which is capable of reading information stored on magnetic recording media at higher densities. The present invention addresses such a need.

SUMMARY OF THE INVENTION

The present invention provides a method and system for providing a magnetoresistive head that reads data from a recording media. The method and system comprise providing a first shield, a second shield, a magnetoresistive sensor, and a lead. The first shield has a first end, a central portion and a second end. The first end is closer to the recording media during use than the second end. The second shield has a first end, a central portion, and a second end. The first end of the second shield is closer to the recording media during use than the second end of the second shield. The first end of the second shield is separated from the first end of the first shield by a read gap. The central portion of the second shield is separated from the central portion of the first shield by a distance that is greater than the read gap. The magnetoresistive sensor is disposed between the first shield and the second shield and has a front end and a back end. The front end of the magnetoresistive is closer to the recording media during use than the back end. The front end of the magnetoresistive sensor is electrically coupled with the first end of the first shield or the first end of the second shield. The lead is electrically coupled with the back end of the magnetoresistive sensor. Thus, current is driven through the magnetoresistive sensor in a direction substantially perpendicular to the recording media during use.

According to the system and method disclosed herein, the present invention provides a magnetoresistive head in which current is driven substantially perpendicular to the recording media and which has an increased flux decay length. The increased flux decay length can be taken advantage of because the direction in which current is driven.

Consequently, the MR head is capable of reading higher density recording media.

DETAILED DESCRIPTION OF THE INVENTION

Figure 1A:
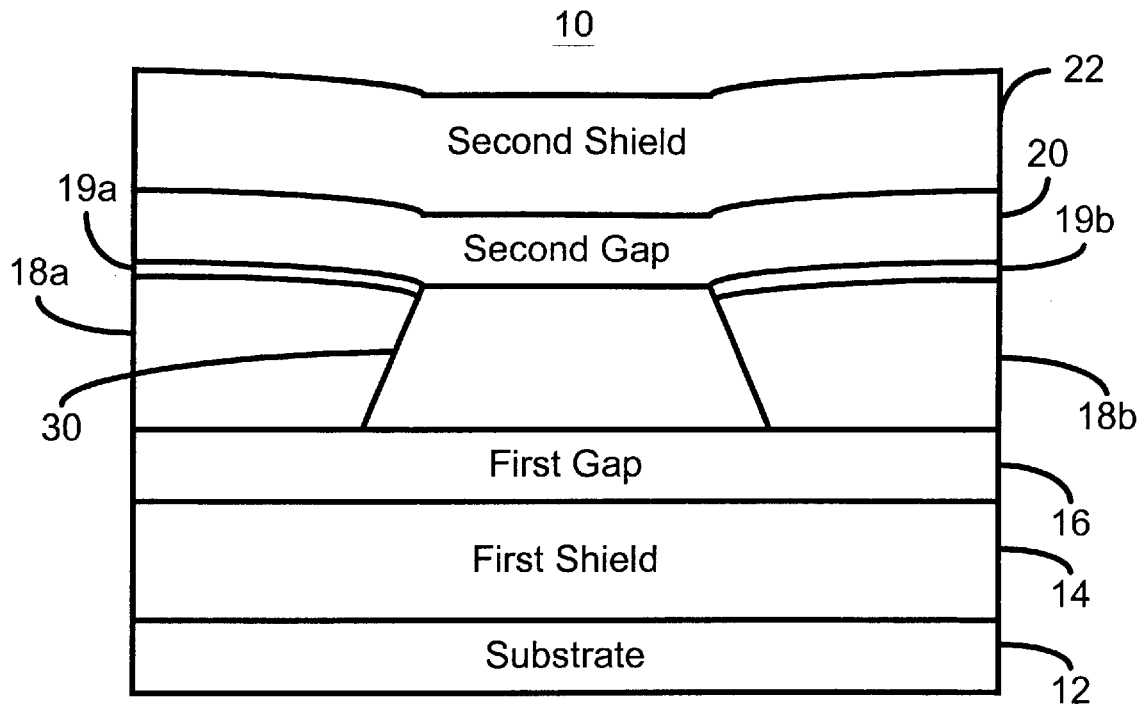
FIG. 1A is a diagram of a conventional magnetoresistive head.
Figure 1B:
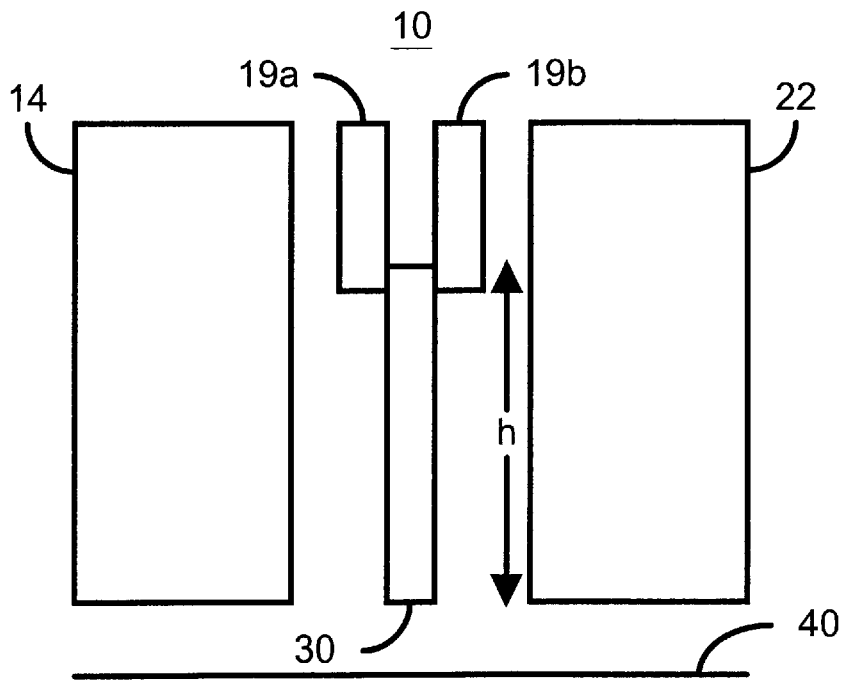
FIG. 1B is another view of the conventional magnetoresistive head.
Figure 2:
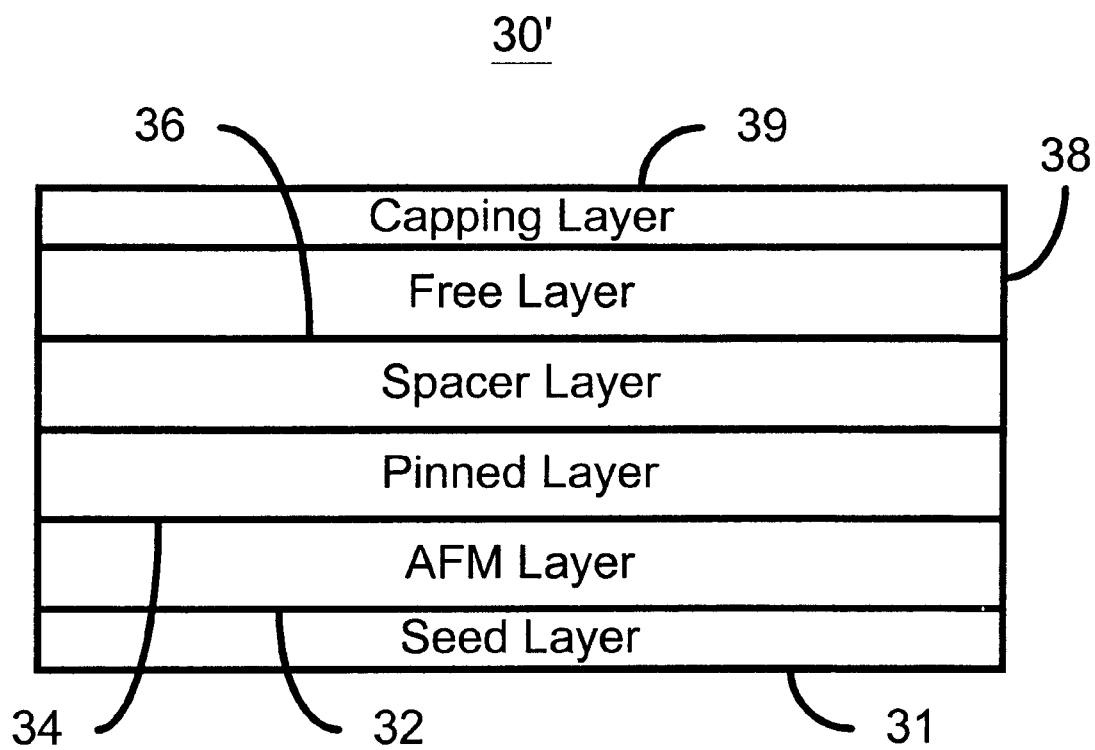
FIG. 2 is a diagram of a conventional GMR sensor, a spin valve.
Figure 3:
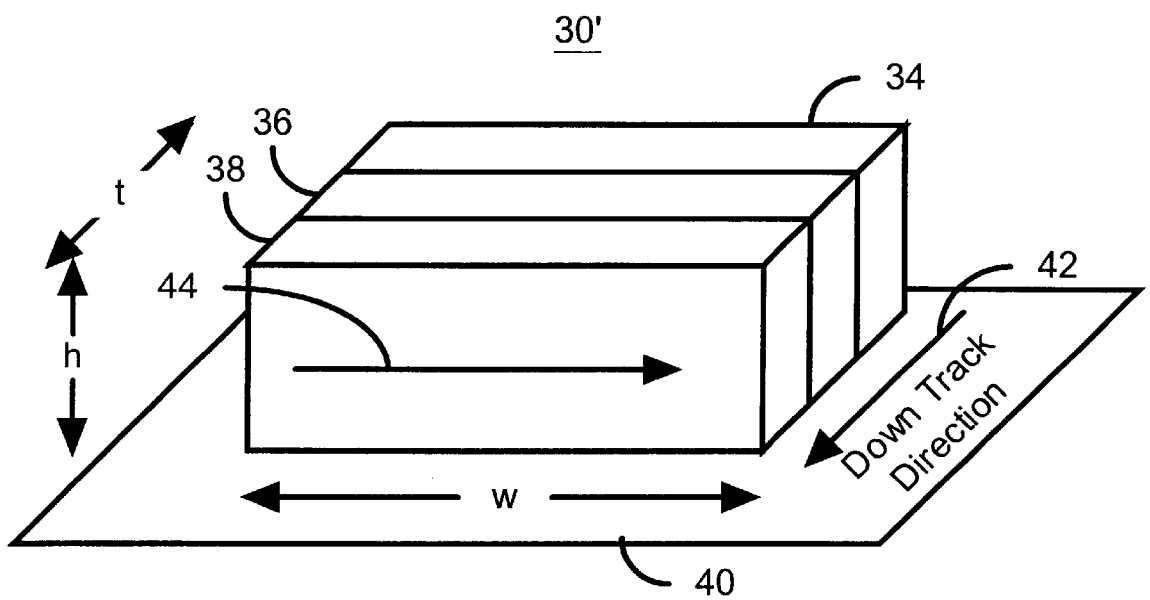
FIG. 3 is a diagram of the conventional GMR sensor during use in the current-in-plane configuration.

The present invention relates to an improvement in magnetoresistive heads. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Conventional MR heads use conventional giant magnetoresistive GMR sensors, such as spin valves. Typically, current is driven parallel to the plane of the layers of the conventional GMR sensor ("CIP"), or perpendicular to the plane of the layers of the conventional GMR sensor ("CPP"). However, in either case, current flows parallel to the surface of the recording media, otherwise known as the ABS. Furthermore, the resistance of the conventional GMR sensor is desired to be kept within a particular range, typically approximately twenty-five to forty-five Ohms. In the CIP configuration, the height of the conventional GMR sensor is approximately half of the width in order to achieve approximately the desired resistance. Consequently, reductions in the track width of tracks written on the recording media and the attendant reductions in the width of the GMR sensor result in sensors which are difficult to fabricate and subject to destruction by ESD. Thus, conventional GMR sensors in conventional MR heads may be unable to read high density media, beyond approximately 35 kTPI with conventional GMR sensor widths on the order of 0.5 $\mu$m or less, for example from 0.2–0.3 $\mu$m. In the CPP configuration, the MR head becomes extremely difficult to fabricate. The CPP configuration will also still result in a device resistance that is too low for the desired device characteristics. Other conventional MR heads are described in the literature in which current is driven perpendicular to the ABS for pairs of spin valves, current for one spin valve is driven toward the recording media, while current for the other spin valve is driven away from the recording media. However, it is unclear how these conventional MR heads would be further optimized for higher density recording media.

The present invention provides a method and system for providing a magnetoresistive head that reads data from a recording media. The method and system comprise providing a first shield, a second shield, a magnetoresistive sensor, and a lead. The first shield has a first end, a central portion and a second end. The first end is closer to the recording media during use than the second end. The second shield has a first end, a central portion, and a second end. The first end of the second shield is closer to the recording media during use than the second end of the second shield. The first end of the second shield is separated from the first end of the first shield by a read gap. The central portion of the second shield is separated from the central portion of the first shield by a distance that is greater than the read gap. The magnetoresistive sensor is disposed between the first shield and the second shield and has a front end and a back end. The front end of the magnetoresistive is closer to the recording media during use than the back end. The front end of the magnetoresistive sensor is electrically coupled with the first end of the first shield or the first end of the second shield. The lead is electrically coupled with the back end of the magnetoresistive sensor. Thus, current is driven through the magnetoresistive sensor in a direction substantially perpendicular to the recording media during use.

The present invention will be described in terms of particular materials used, a particular head, and a particular configuration of the MR head. However, one of ordinary skill in the art will readily recognize that this method and system will operate effectively for other materials and other head configurations consistent with the present invention. For example, the present invention is consistent with the use of a spin valve, a dual spin valve, a synthetic spin valve, or other magnetoresistive sensor. Furthermore, the present invention can be used in a simple read head, a merged head, or another head which utilizes a GMR sensor as described herein.

Figure 4A:
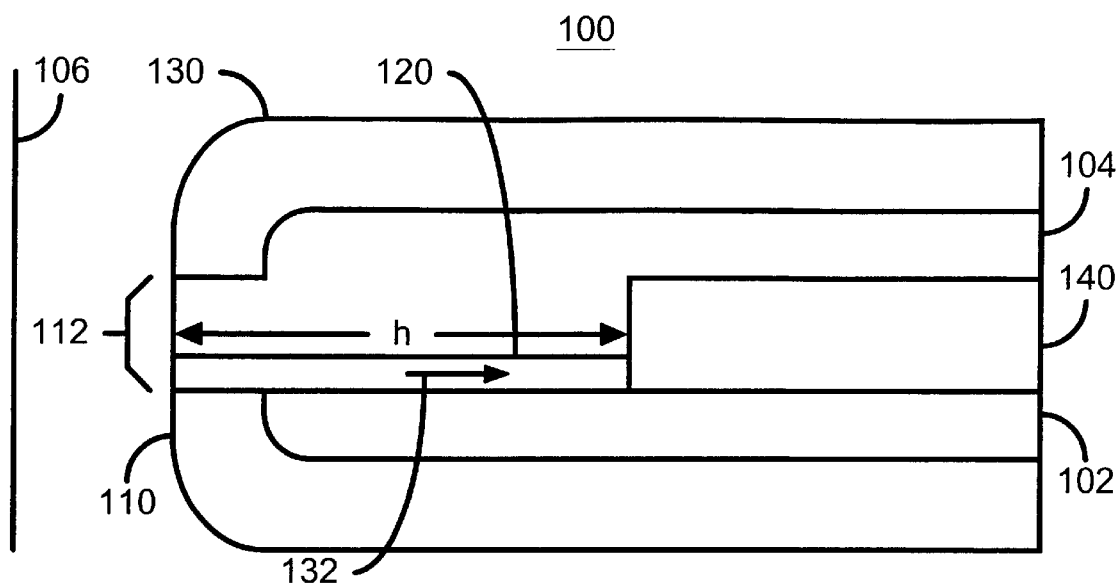
FIG. 4A is a diagram of one embodiment of a magnetoresistive head in accordance with the present invention.

FIG. 4A depicts one embodiment of a MR head 100 in accordance with the present invention. Also depicted is a recording media 106 that is not part of the MR head 100. The MR head 100 includes a first shield 110, a GMR sensor 120, a second shield 130, and a lead 140. A first gap 102 separates the first shield 110 from the GMR sensor 120. A second gap 104 separates the second shield 130 from the GMR sensor 120. The first shield 110 and second shield 130 prevent magnetic flux from bits not being read from reaching the GMR sensor 120. The read gap 112 allows flux from the bit being read to reach the GMR sensor 120. Thus, the size of the read gap 112 and, therefore, the separation between the first shield 110 and the second shield 130 at the read gap 112, is determined by the size of bits being read. The GMR sensor 120 can be any GMR sensor, including but not limited to a spin valve, a dual spin valve, a synthetic spin valve or a synthetic dual spin valve. The GMR sensor 120 has a stripe height, h. The portions of the shields 110 and 120 are separated by a read gap 112. The read gap 112 allows flux from a recording media 106 to reach the GMR sensor 120.

The GMR sensor 120 is coupled at the front end, closest to the recording media 106, with the end of the first shield 110. The back end of the GMR sensor 120 is coupled to the lead 140. Thus, the first shield 110 serves as a lead. Current is driven between the front end of the GMR sensor 120 and the back end of the GMR sensor 120, substantially perpendicular to the recording media 106. The preferred direction in which current is driven is depicted by the arrow 132. However, current can be driven in the opposite direction.

Figure 4B:
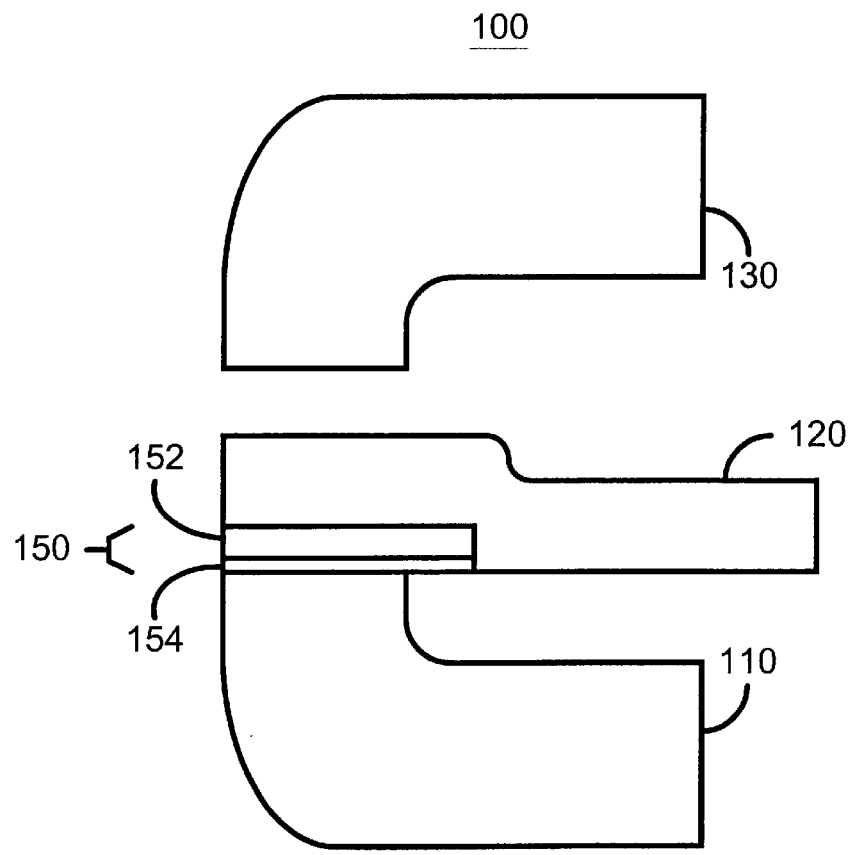
FIG. 4B is a diagram of a portion of one embodiment of the magnetoresistive head in accordance with the present invention.

FIG. 4B is a more detailed diagram of a portion of one embodiment of the MR head 100. A portion of the first shield 110, the second shield 130, the GMR sensor 120 and the read gap 112 are depicted. Also shown is a second lead 150, which may be used to couple the GMR sensor 120 to the first shield 110. In a preferred embodiment, the second lead 150 is a laminated structure. The preferred embodiment of the second lead 150 includes a nonmagnetic layer 152 and a magnetic layer 154. The nonmagnetic layer 152 preferably includes a nonmagnetic metal such as tantalum. In one embodiment, the nonmagnetic layer 152 is approximately ten nanometers thick. The magnetic layer 154 preferably includes a magnetic metal such as permalloy. Also in a preferred embodiment the magnetic layer 154 is thicker than the nonmagnetic layer 152. The nonmagnetic layer 152 is used to help break any exchange coupling between the first shield 110 and the GMR sensor 120. Consequently, the GMR sensor 120 can respond to an external magnetic field. The magnetic layer 154 aids in reducing the reluctance of the GMR sensor 120 in the read throat region, thereby increasing signal amplitude for the MR head 100.

Figure 4C:
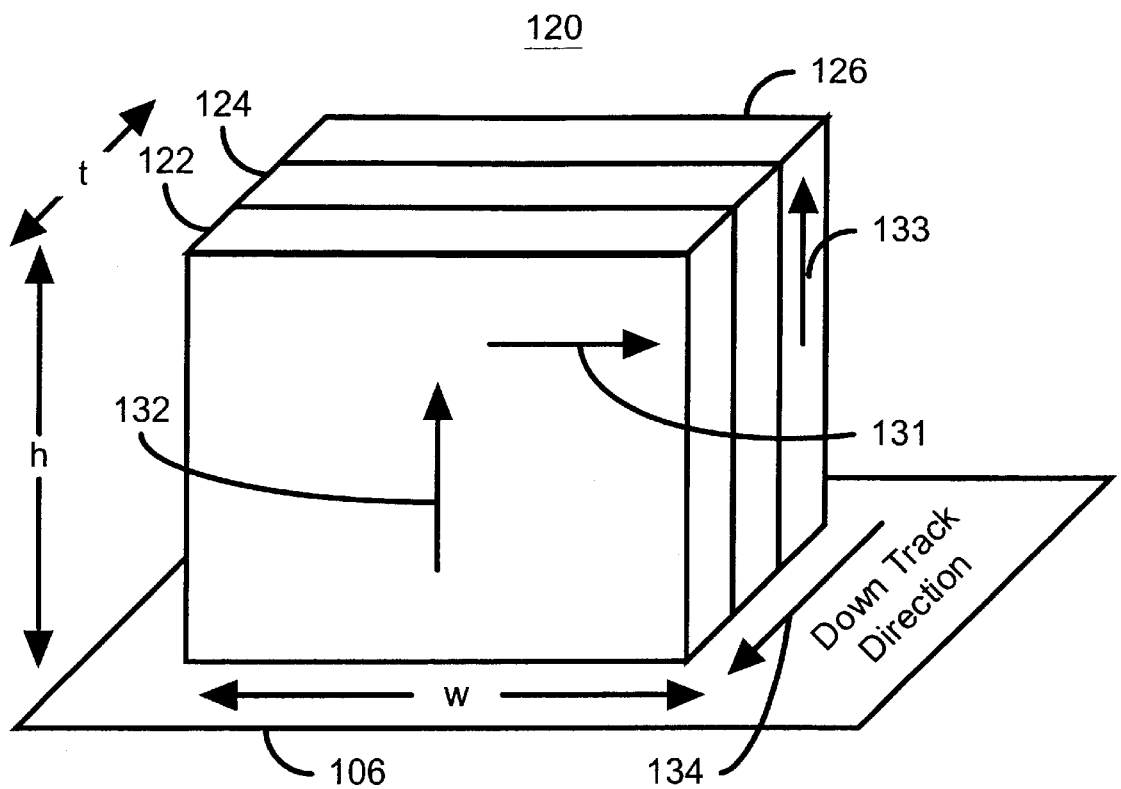
FIG. 4C is a diagram of how current is driven through the magnetoresistive sensor.

FIG. 4C depicts one embodiment of a portion of a GMR sensor 120 and the recording media 106. A free layer 122, a spacer layer 124 and a pinned layer 126 of the GMR sensor 120 are shown. Not depicted is an antiferromagnetic ("AFM") or other pinning layer of the GMR sensor 120 and any other layers of the GMR sensor 120. Also depicted are the width, w, the thickness, t, and the stripe height of the GMR sensor 120. The arrow 132 indicates the direction in which current is driven. The arrow 134 depicts the down track direction, in which the MR head 100 travels. Thus, the track width is parallel to the width of the GMR sensor 120. The magnetization of the pinned layer 126 is pinned substantially parallel to the direction in which the magnetic flux from the recording media 106, as shown by arrow 133. The free layer 122 is fabricated so that the magnetization of the free layer is substantially perpendicular to the magnetization of the pinned layer 126 in the absence of an external magnetic field, as shown by directional indicator 131. Thus, the GMR sensor 120 may be fabricated in substantially the same manner as a conventional GMR sensor.

Because current is driven in a direction substantially perpendicular to the surface of the recording media, current flows along the stripe height of the GMR sensor 120. Current also flows parallel to the planes of the GMR sensor 120. The resistance of the GMR sensor 120 is proportional to the stripe height and inversely proportional to the product of the width and the thickness of the GMR sensor 120. Thus, the resistance of the GMR sensor 120 is now proportional to the stripe height and inversely proportional to the width of the GMR sensor 120. This is the inverse of the conventional CIP configuration. Thus, to achieve the desired resistance of approximately twenty-five to forty-five Ohms, the stripe height is longer than the width of the GMR sensor. In a preferred embodiment, the stripe height is approximately twice the width of the GMR sensor 120, instead of being approximately half the width as for a conventional GMR sensor. Therefore, for the desired width of approximately 0.2–0.3 $\mu$m, the stripe height is on the order of 0.4–0.6 $\mu$m. Such a GMR sensor 120 is relatively simple to fabricate. In particular, lapping may be used to set the stripe height of the GMR sensor 120. Thus, it is possible to produce the MR head 100 capable of reading higher density recording media, having a density of thirty-five kTPI or higher.

Driving the current substantially perpendicular to the recording media 106 provides another benefit. As discussed above, the magnetization of the free layer 122 is preferably perpendicular to the direction in which current is driven in the absence of an external magnetic field. The current flowing through the GMR sensor 120 generates a magnetic field perpendicular to the direction in which current flows. Consequently, the current driven through the GMR sensor 120 can be used to magnetically bias the free layer 122. Thus, in a preferred embodiment, the free layer 122 maintains a single domain structure at least in part due to the current driven through the GMR sensor 120 during use.

As discussed above, the GMR sensor 120 has a higher stripe height for the same width than a conventional GMR sensor. Furthermore, the cross-sectional area of the GMR sensor 120 is higher than for a conventional GMR sensor. As discussed above, the cross-sectional area through which current flows for a conventional GMR sensor in the CIP configuration is the thickness multiplied by the stripe height. For such a conventional GMR sensor, the stripe height is approximately half of the width. In the GMR sensor 120, the cross-sectional area through which current flows is the thickness multiplied by the width. The width of the GMR sensor 120 is approximately twice the stripe height of a conventional GMR sensor which would be used for reading the same media. Consequently, the cross-sectional area for the GMR sensor 120 is approximately twice that of a conventional GMR sensor. Typically, a current density is selected for operation of a GMR sensor. The current density determines characteristics such as the heating and, therefore, the operational lifetime of the device. Because the GMR sensor 120 has twice the cross-sectional area of a conventional GMR sensor, the GMR sensor can carry twice the total current while achieving the same current density. For example, a conventional GMR sensor operates at approximately $2\times10^7$ A/cm$^2$. The GMR sensor could be operated at twice the total current and still achieve the same current density of $2\times10^7$ A/cm$^2$. The signal from a GMR sensor is proportional to the total current through the GMR sensor. Consequently, the signal from the GMR sensor 120 is higher because a higher current can be used.

Furthermore, an even higher signal can be produced by the GMR sensor 120 due to the length of the GMR sensor 120. Referring back to FIGS. 4A and 4B, in the MR head 100, the distance between the first shield 110 and the second shield 130 increases away from the read gap 112. As discussed above, the separation between the first shield 110 and the second shield 130 at the read gap 112 is determined by the size of bits being read. However, this limitation is not required away from the read gap 112. Thus, the central portion of the first shield 110, along the GMR sensor 120 and away from the read gap 112, and the central portion of the second shield 130, also along the GMR sensor 120 and away from the read gap 112, are separated by a larger distance than the size of the read gap 112. In order to ensure that the first shield and second shield 130 are separated by a greater distance at their central portions than at the read gap, the central portions of the first and second shields 110 and 130, respectively, are recessed. However, in alternate embodiments, the central portion of only one of the shield may be recessed.

Because the first shield 110 and the second shield 130 are separated by a greater distance at their central portions than at the read gap 112, the flux decay length is longer. The first shield 110 and second shield 130 still are significantly larger than the GMR sensor 120. Thus, as magnetic flux travels up the GMR sensor 120, the magnetic flux leaks out of the GMR sensor 120 and into the shields 110 and 130. However, the distance between the shields 110 and 130 away from the read gap 112 has been increased. Because the central portions of the shields 110 and 130 are farther from the GMR sensor 120, magnetic flux leaks out of the GMR sensor 120 more slowly. Thus, the flux decay length is increased.

Because the flux decay length is higher, the GMR sensor 120 can provide an even higher signal. The GMR sensor 120 can be made longer without increasing the portion of the GMR sensor 120 that does not experience magnetic flux and does not provide the attendant magnetoresistance because the flux decay length is longer. The increased flux decay length can also be taken advantage of because the current is driven perpendicular to the recording media 106. A GMR sensor 120 having a larger stripe height can be used because the desired aspect ratio for the GMR sensor has changed, as discussed above. Therefore, a GMR sensor 120 having a length which is larger than for a conventional GMR sensor and approximately the same as the increased flux decay length can be used. In a preferred embodiment, the GMR sensor 120 is slightly longer than the flux decay length. Because the flux decay length is longer, the GMR sensor 120 can be made longer. The resistance of the GMR sensor 120 is, therefore, slightly higher. Furthermore, approximately the entire GMR sensor 120 contributes to the magnetoresistance. The signal amplitude depends upon the magnetoresistance (change in resistance due to the magnetic field) and the resistance of the GMR sensor 120. A higher resistance which maintains the high magnetoresistance provides a larger signal. Consequently, not only is it possible to fabricate the MR head 100 capable of reading higher density recording media, but a larger signal than for a conventional MR head is also provided.

In addition, the MR head 100 is less subject to destruction of the GMR sensor 120 due to ESD. The GMR sensor 120 is electrically shorted to the first shield 110, preferably via the second lead 150. Shorting the GMR sensor 120 to the first shield 110 provides a low resistance path, through the first shield 110, for dissipating an electrostatic charge. A charge residing on the GMR sensor 120 may be shunted through the first shield 110. Consequently, the GMR sensor 120 is protected from destruction due to ESD, even though the GMR sensor 120 is appropriate for reading higher density recording media 106.

Figure 5:
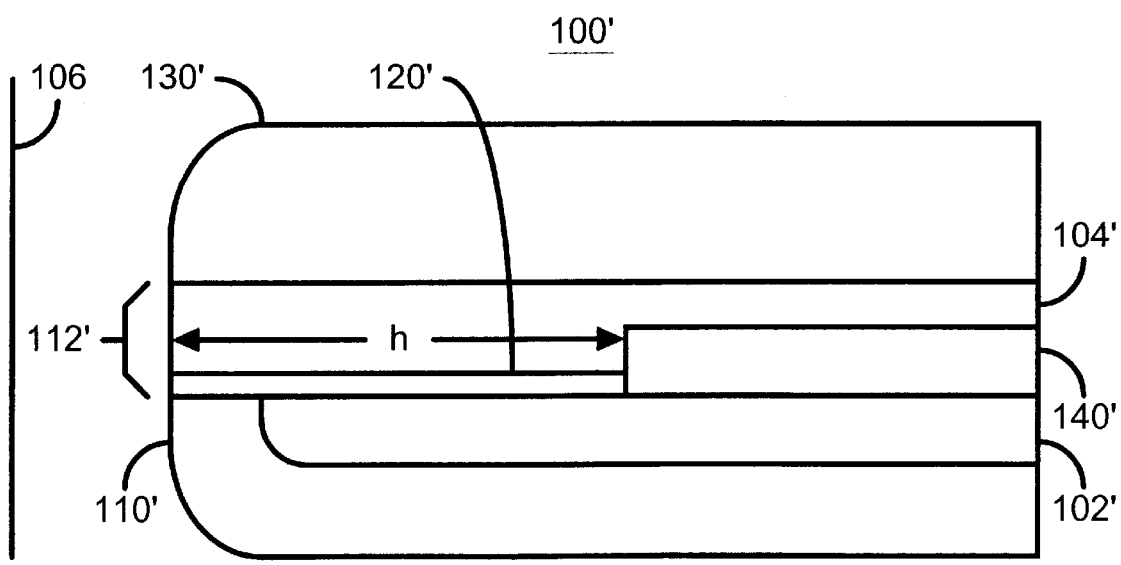
FIG. 5 is a diagram of a second embodiment of a magnetoresistive head in accordance with the present invention.

FIG. 5 depicts an alternate embodiment of the invention in an MR head 100' in accordance with the present invention. The MR head 100' is substantially the same as the MR head 100 depicted in FIGS. 4A–C. Referring back to FIG. 5, the MR head 100' thus includes a first shield 110', a GMR sensor 120', a second shield 130', a lead 140', a read gap 112', a first gap 102' and a second gap 104'. The first shield 110', the GMR sensor 120', the second shield 130', the lead 140', the read gap 112', the first gap 102' and the second gap 104' correspond to the first shield 110, the GMR sensor 120, the second shield 130, the lead 140, the read gap 112, the first gap 102 and the second gap 104, respectively. The GMR sensor 120' may also be shorted to the first shield 110' using a lead substantially the same as the second lead 150 shown in FIG. 4B. Consequently, substantially the same benefits can be achieved using the MR head 100' of FIG. 5 as the MR head 100. However, although the central portions of the second shield 130' and the first shield 110' are separated by a greater distance than at the read gap 112', the central portion of the second shield 130' is not recessed. Consequently, the flux decay length for the MR head 100' may be less than that of the MR head 100.

Figure 6:
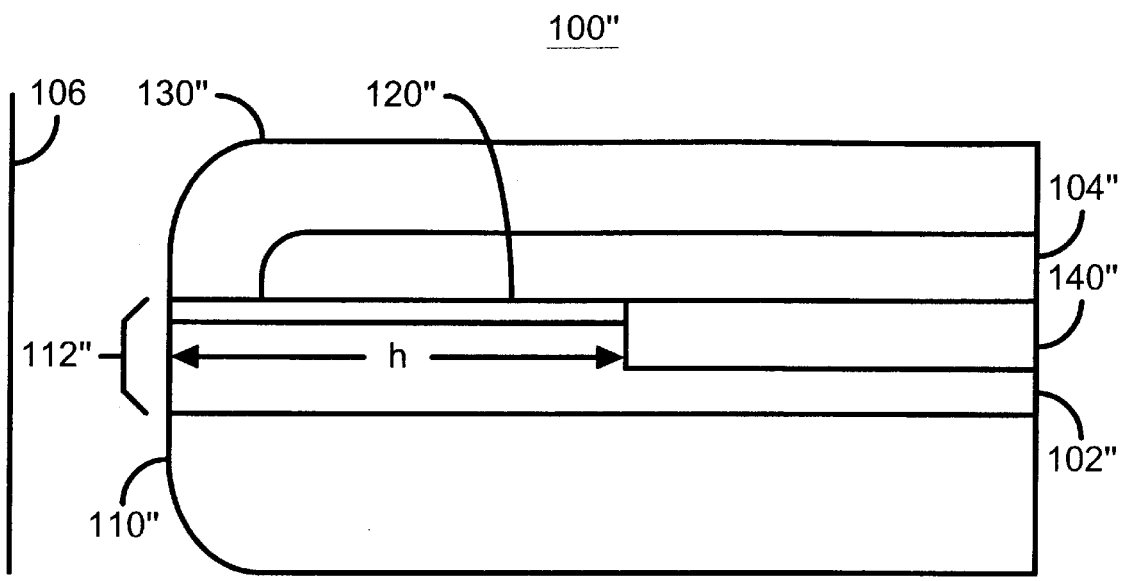
FIG. 6 is a diagram of a third embodiment of a magnetoresistive head in accordance with the present invention.

FIG. 6 depicts a third embodiment of the invention in an MR head 100" in accordance with the present invention. The MR head 100" is substantially the same as the MR head 100 shown in FIGS. 4A–C. Referring back to FIG. 6, the MR head 100" thus includes a first shield 110", a GMR sensor 120", a second shield 130", a lead 140", a read gap 112", a first gap 102" and a second gap 104". The first shield 110", the GMR sensor 120", the second shield 130", the lead 140", the read gap 112", the first gap 102" and the second gap 104" correspond to the first shield 110, the GMR sensor 120, the second shield 130, the lead 140, the read gap 112, the first gap 102 and the second gap 104, respectively. The GMR sensor 120" may also be shorted to the second shield 130" using a lead substantially the same as the lead 150. Consequently, substantially the same benefits can be achieved using the MR head 100" as the MR head 100. However, although the central portions of the second shield 130" and the first shield 110" are separated by a greater distance than at the read gap 112", the central portion of the first shield 110" is not recessed. Consequently, the flux decay length for the MR head 100" may be less than that of the MR head 100. Furthermore, the MR sensor 120" is shorted to the second shield 130" rather than the first shield 110". However, the shield to which the GMR sensor 120" is shorted should not greatly affect the functioning of the MR head 100".

Figure 7:
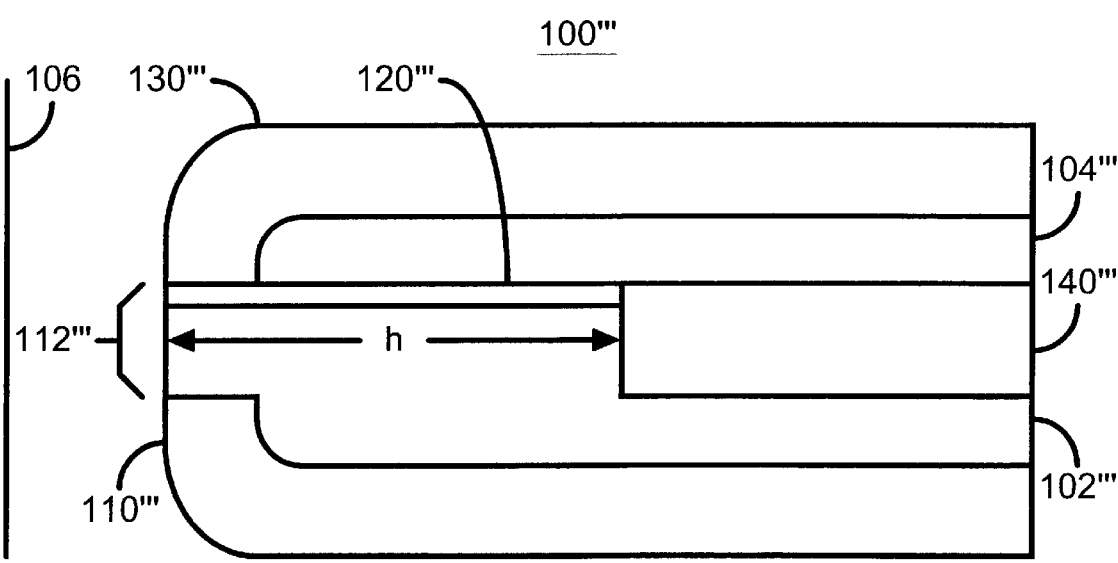
FIG. 7 is a diagram of a fourth embodiment of a magnetoresistive head in accordance with the present invention.

FIG. 7 depicts a fourth embodiment of the invention in an MR head 100''' in accordance with the present invention. The MR head 100''' is substantially the same as the MR head 100 shown in FIGS. 4A–C. Referring back to FIG. 7, the MR head 100''' thus includes a first shield 110''', a GMR sensor 120''', a second shield 130''', a lead 140''', a read gap 112''', a first gap 102''' and a second gap 104'''. The first shield 110''', the GMR sensor 120''', the second shield 130''', the lead 140''', the read gap 112''', the first gap 102''' and the second gap 104''' correspond to the first shield 110, the GMR sensor 120, the second shield 130, the lead 140, the read gap 112, the first gap 102 and the second gap 104, respectively. The GMR sensor 120''' may also be shorted to the first shield 110''' using a lead substantially the same as the second lead 150. Consequently, substantially the same benefits can be achieved using the MR head 100''' as the MR head 100. However, the MR sensor 120''' is shorted to the second pole 130''' rather than the first pole 110'''. However, the pole to which the GMR sensor 120''' is shorted should not greatly affect the operation of the MR head 100'''. Furthermore, both the first shield 110''' and the second shield 130''', which may be coupled to a pole of or a write head in a merged head, are recessed. Thus, the central portions of the first shield 110''' and the second shield 130''' are separated by a greater distance than at the read gap 112'''. As a result, the flux decay length for the MR head 100''' is increased.

Figure 8:
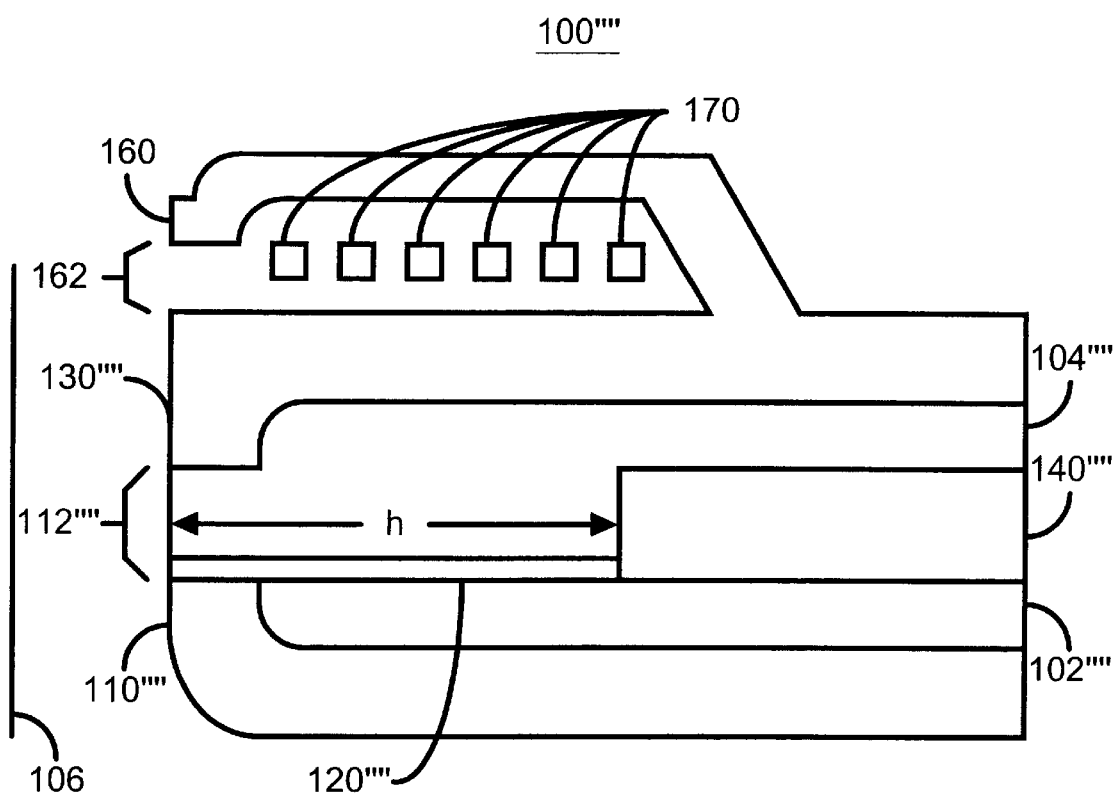
FIG. 8 is a diagram of a fifth embodiment of a magnetoresistive head in accordance with the present invention in a merged head.

FIG. 8 depicts a fourth embodiment of the invention in a MR head 100"" in accordance with the present invention. The MR head 100"" is substantially the same as the MR head 100 shown in FIGS. 4A–C. Referring back to FIG. 8, the MR head 100"" thus includes a first shield 110"", a GMR sensor 120"", a second shield 130"", a lead 140"", a read gap 112"", a first gap 102"" and a second gap 104"". The first shield 110"", the GMR sensor 120"", the second shield 130"", the lead 140"", the read gap 112"", the first gap 102"" and the second gap 104"" correspond to the first shield 110, the GMR sensor 120, the second shield 130, the lead 140, the read gap 112, the first gap 102 and the second gap 104, respectively. The GMR sensor 120"" may also be shorted to the first shield 110"" using a lead substantially the same as the lead 150. Consequently, substantially the same benefits can be achieved using the MR head 100"" as the MR head 100. However, the MR head 100"" is a merged head. The MR head 100"", therefore, also includes a write head. Thus, the MR head 100"" also includes a second pole 160, a write gap 162 and at least one coil 170. In the MR head 100"", the second shield 130"" also functions as the first pole. Note that any embodiment of the MR head 100, 100', 100", or 100''' could be part of a merged head as in FIG. 8.

Figure 9:
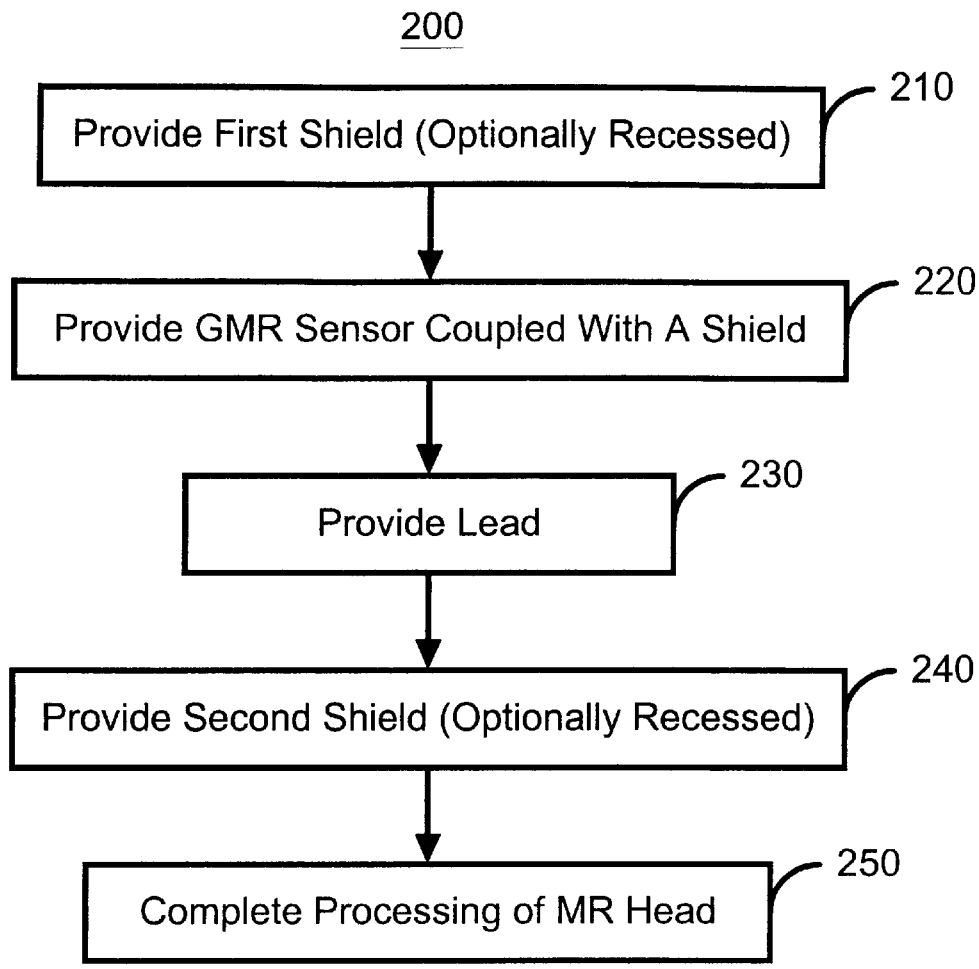
FIG. 9 is a flow chart depicting one embodiment of a method for providing a magnetoresistive head in accordance with the present invention.

FIG. 9 depicts one embodiment of a method 200 for providing the MR head 100, 100', 100", 100''', or 100"" in accordance with the present invention. The first shield, optionally recessed, is provided, via step 210. For example, if the MR head 100, 100', 100''', or 100"" is being provided, then the first shield is recessed. The GMR sensor, coupled with one of the shields, is then provided, via step 220. Thus, step 220 may include providing first and second gaps between the shields and the GMR sensor. Step 220 also includes providing the desired type of GMR sensor, such as a spin valve, a synthetic spin valve, or a dual spin valve. Furthermore, step 220 should control the endpoint of the GMR sensor. Because the GMR sensor is coupled with one of the shields, a portion of the GMR sensor will generally be dead. In particular, the portion of the GMR sensor that is physically coupled with the shield may not provide as large a resistance and may undergo less magnetoresistance due to shunting by the connected shield. Furthermore, the flux decay length is measured starting at the very edge of the shield. Consequently, an otherwise useful portion of the GMR sensor is lost. Thus, the portion of the GMR sensor that is physically coupled to the shield is preferably reduced, while maintaining a good electrical contact to the shield in step 220. Preferably, the portion of the GMR sensor that is physically coupled to the shield is desired to be one to two micro-inches or less. Furthermore, the zero throat position of the write head and the read head should be aligned in a merged head in order to reduce the unusable portion of the GMR sensor. Thus, the endpoint of the GMR sensor should be well controlled in step 220.

A lead coupled to the back end of the GMR sensor is then provided, via step 230. The second shield, optionally recessed, is then provided, via step 240. For example, if the MR head 100, 100", 100'", or 100"" is being provided, then the second shield is recessed. Thus, the combination of steps 210 and 220 ensure that the shields are separated by a larger distance at their central portions than at the read gap. Fabrication of the MR head is then completed, via step 250. Step 250 may include forming the portion of the MR head used for writing if a merged head is being formed. Step 250 may also include lapping the GMR sensor so that the stripe height has the desired length.

Figure 10:
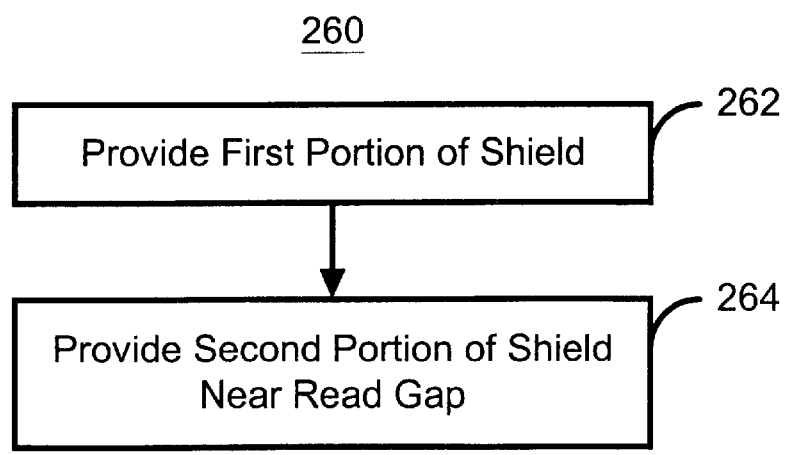
FIG. 10 is a flow chart depicting one embodiment of a method for providing a magnetoresistive head in accordance with the present invention.

FIG. 10 depicts one embodiment of a method 260 for providing a recessed shield. Thus, the method 260 may be used for providing the shield in step 210 or 240. The longer, central portion of the shield is deposited. A second portion of the shield near the read gap is provided, via step 262. The second portion of the shield may be provided by masking the MR head so that the portion near the read gap is exposed, then depositing the second portion of the pole. The second portion of the shield may also be provided by etching a portion of the shield provided in step 262 or depositing and etching an additional layer. If the recessed shield is the first shield, then step 262 may be provided before step 264. If the recessed shield is the second shield, then step 264 may be performed prior to step 262.

Figure 11A:
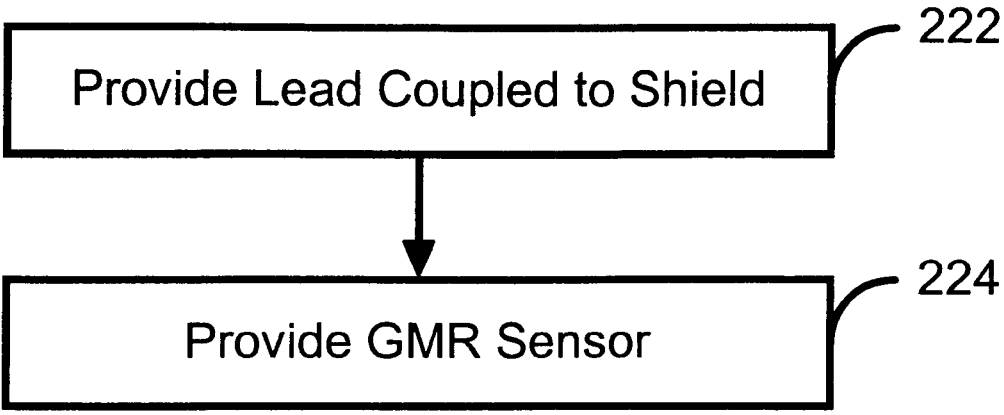
FIG. 11A is a flow chart depicting one embodiment of a method for providing a recessed shield in accordance with the present invention.

FIG. 11A depicts one embodiment of step 220, providing the GMR sensor. The lead is provided, via step 222. The GMR sensor is provided, via step 224. If the GMR sensor is shorted to the first shield, then step 222 is provided prior to step 224. If, however, the GMR sensor is shorted to the second shield, then step 224 is provided prior to step 222. Thus, the GMR sensor coupled with one of the shields is provided.

Figure 11B:
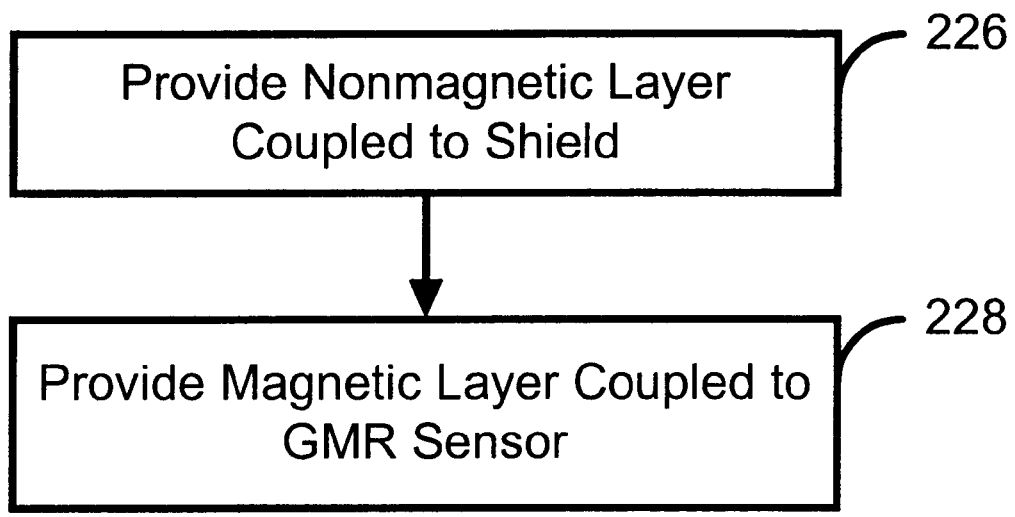
FIG. 11B is a flow chart depicting one embodiment of a method for providing the magnetoresistive sensor in accordance with the present invention.

FIG. 11B depicts one embodiment of a method for providing the lead in step 222. A nonmagnetic layer coupled with the appropriate shield is provided, via step 226. A magnetic layer coupled with the GMR sensor is provided, via step 228. If the lead couples the GMR sensor to the first shield, then step 226 is preferably provided prior to step 228. If the lead couples the GMR sensor to the second shield, then step 228 is preferably provided prior to step 226.

Figure 12C:
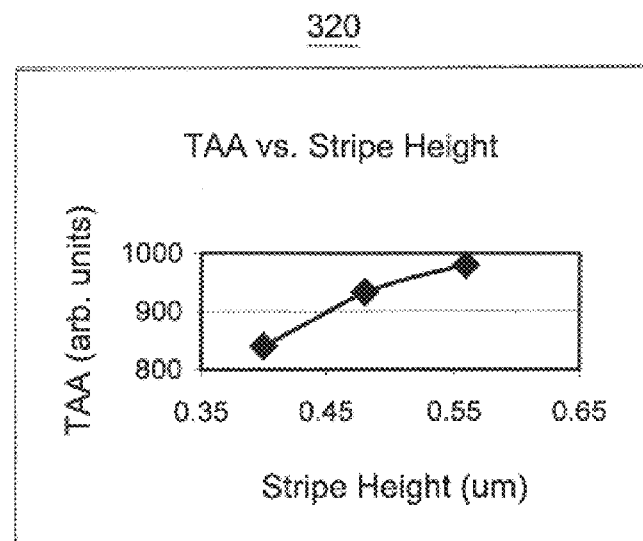
FIG. 12C is a graph depicting the modeled track average amplitude versus stripe height for a media remanence magnetization of 0.4 milli-emu per square centimeter and a physical read width of 0.4 micrometers.
Figure 12A:
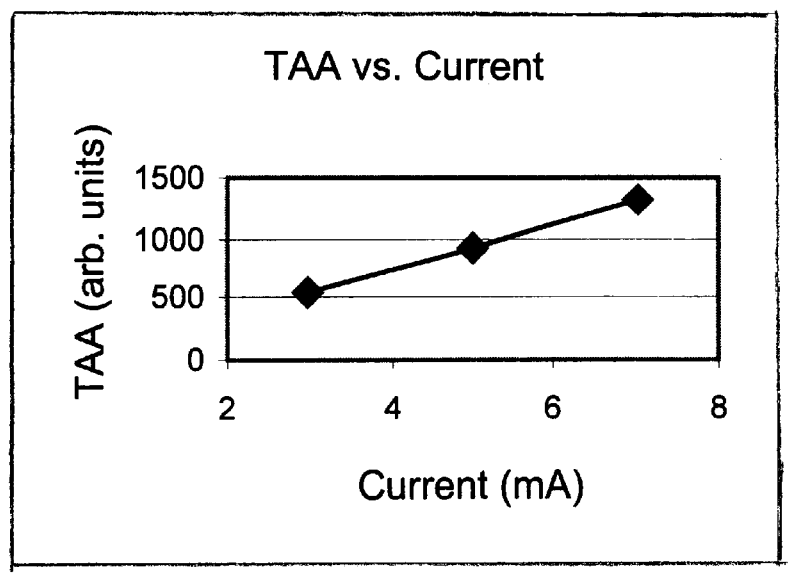
FIG. 12A is a graph depicting the modeled track average amplitude versus current for a media remanence magnetization of 0.4 milli-emu per square centimeter.
Figure 12B:
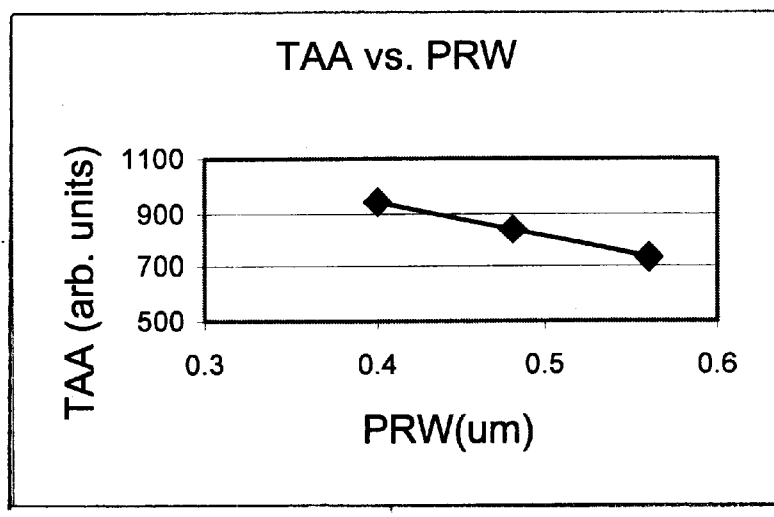
FIG. 12B is a graph depicting the modeled track average amplitude versus physical read width for a stripe height of 0.48 micrometers and a media remanence magnetization of 0.4 milli-emu per square centimeter.

To illustrate the advantages of the present invention, refer to FIGS. 12A, 12B and 12C. FIG. 12A includes a plot 300 of the modeled track average amplitude ("TAA") versus current. FIG. 12B includes a plot 310 of the modeled TAA versus physical read width ("PRW"). FIG. 12C includes a plot 320 of the TAA versus stripe height. For the curve 300, 310 and 320, the remanence magnetization is 0.4 memu/cm$^2$. For the curve 310, the stripe height is 0.48 $\mu$m. for the curves 310 and 320, the PRW is 0.4 $\mu$m. As depicted in FIGS. 12A and 12B, the TAA for the present invention increases with increasing current and decreases with increasing PRW. More importantly, FIG. 12C indicates that the TAA actually increases with increasing stripe height. Thus, in contrast to a conventional GMR sensor in a CIP configuration, an increase in stripe height for the present invention can result in an increase in response.

Figure 13:
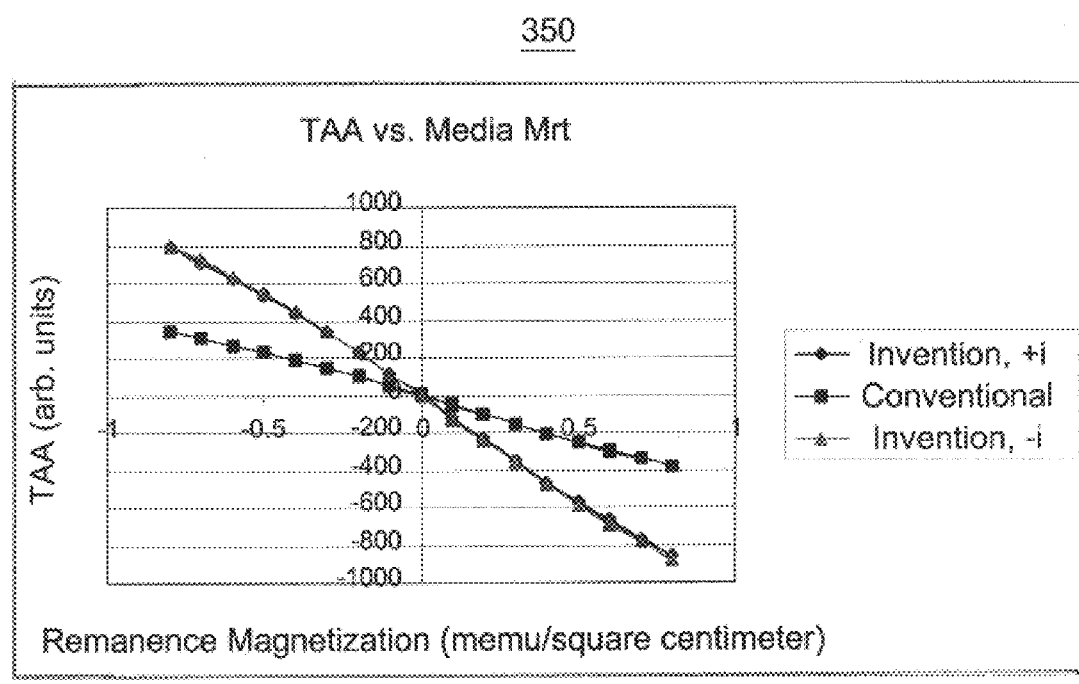
FIG. 13 is a graph depicting the modeled transfer curve; the modeled track average amplitude versus media remanence magnetization for an embodiment of the present invention and a conventional GMR sensor.

To further illustrate the advantages of the present invention, refer to FIG. 13 which depicts a plot 350 of the modeled transfer curve. Thus, the plot 350 depicts the modeled track average amplitude versus media remanence magnetization for an embodiment of the present invention and a conventional GMR sensor. The PRW for the conventional dual spin valve and the embodiment of the present invention is 0.4 $\mu$m. The stripe heights for the conventional GMR sensor and the embodiment of the present invention are 0.48 $\mu$m. A current of five milliamps is used for both the embodiment of the present invention and the conventional GMR sensor. However, the current is provided in two directions, toward and away from the ABS, for the embodiment of the present invention. As can be seen in FIG. 13, the response for the present invention is significantly greater than for a conventional GMR sensor. At some media remanence magnetization, the TAA for the present invention is approximately twice that of a conventional GMR sensor. Thus, a sensor in accordance with the present invention has improved response and can operate at higher track densities.

A method and system has been disclosed for providing a magnetoresistance head that can operate at higher track densities. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A magnetoresistive head for reading data from a recording media comprising:

a first shield having a first end, a central portion and a second end, the first end being closer to the recording media during use than the second end;

a second shield having a first end, a central portion, and a second end, the first end of the second shield being closer to the recording media during use than the second end of the second shield, the first end of the second shield being separated from the first end of the first shield by a read gap, the central portion of the second shield being separated from the central portion of the first shield by a distance that is greater than the read gap;

a magnetoresistive sensor disposed between the first shield and the second shield, the magnetoresistive sensor having a front end and a back end, the front end of the magnetoresistive sensor being closer to the recording media during use than the back end, the front end of the magnetoresistive sensor being electrically coupled with the first end of the first shield or the first end of the second shield, the magnetoresistive sensor being a giant magnetoresistive sensor; and a lead electrically coupled with the back end of the magnetoresistive sensor;

wherein current is driven through the magnetoresistive sensor in a direction substantially perpendicular to the recording media during use.

2. The magnetoresistive head of claim 1 wherein the magnetoresistive sensor is a spin valve.

3. The magnetoresistive head of claim 1 wherein the magnetoresistive sensor is a dual spin valve.

4. The magnetoresistive head of claim 1 wherein the magnetoresistive sensor is a synthetic spin valve.

5. The magnetoresistive head of claim 1 wherein the magnetoresistive sensor is a synthetic dual spin valve.

6. The magnetoresistive head of claim 1 wherein the front end of the magnetoresistive sensor is coupled with the first end of the first shield using a conductor, the conductor including a first nonmagnetic layer and a second magnetic layer.

7. The magnetoresistive head of claim 1 further comprising:
a write head including a first pole, a second pole, and at least one coil, a portion of the second pole separated from a portion of the first pole by a write gap.

8. The magnetoresistive head of claim 1 wherein the distance between the central portion of the first shield and the central portion of the second shield is greater than the read gap because the central portion of the first shield and the central portion of the second shield are recessed.

9. The magnetoresistive head of claim 1 wherein the magnetoresistance sensor has a stripe height that is approximately a flux decay length for the magnetoresistive head.

10. A method for providing a magnetoresistive head for reading information on a recording media, the method comprising the steps of:
(a) providing a first shield having a first end, a central portion and a second end, the first end being closer to the recording media during use than the second end;
(b) providing a second shield above the first shield, the second shield having a first end, a central portion, and a second end, the first end of the second shield being closer to the recording media during use than the second end of the second shield, the first end of the second shield being separated from the first end of the first shield by a read gap, the central portion of the second shield being separated from the central portion of the first shield by a distance that is greater than the read gap;
(c) providing a magnetoresistive sensor between the first shield and the second shield, the magnetoresistive sensor having a front end and a back end, the front end of the magnetoresistive sensor being closer to the recording media during use than the back end, the front end of the magnetoresistive sensor being electrically coupled with the first end of the first shield or the first end of the second shield, the magnetoresistive sensor being a giant magnetoresistive sensor;
(d) providing a lead electrically coupled with the back end of the magnetoresistive sensor;
wherein current is driven through the magnetoresistive sensor in a direction substantially perpendicular to the recording media during use.

11. The method of claim 10 wherein the step of providing the magnetoresistive sensor (c) further includes the step of:
(c1) providing a spin valve.

12. The method of claim 10 wherein the step of providing the magnetoresistive sensor (c) further includes the step of:
(c1) providing a dual spin valve.

13. The method of claim 10 wherein the step of providing the magnetoresistive sensor (c) further includes the step of:
(c1) providing a synthetic spin valve.

14. The method of claim 10 wherein the step of providing the magnetoresistive sensor (c) further includes the step of:
(c1) providing a synthetic dual spin valve.

15. The method of claim 10 further wherein the step of providing the magnetoresistive sensor (c) further includes the step of:
(c1) providing a conductor to electrically couple the front end of the magnetoresistive sensor with the first end of the first shield, the conductor including a first nonmagnetic layer and a second magnetic layer.

16. The method of claim 10 further comprising the step of:
(e) providing a write head including a first pole, a second pole, and at least one coil, a portion of the second pole separated from a portion of the first pole by a write gap.

17. The method of claim 10 wherein the first shield providing step (a) further includes the step of:
(a1) ensuring that the central portion of the first shield is recessed from the first portion of the first shield.

18. The method of claim 17 wherein the second shield providing step (b) further includes the step of:
(b1) ensuring that the central portion of the second shield is recessed from the first portion of the second shield.

19. The method of claim 10 wherein the second shield providing step (b) further includes the step of:
(b1) ensuring that the central portion of the second shield is recessed from the first portion of the second shield.

20. The method of claim 10 wherein the magnetoresistance sensor has a stripe height that is approximately a flux decay length for the magnetoresistive head.

21. The method of claim 10 wherein the first shield providing step (a) is performed prior to the second shield providing step (b).

* * * * *